United States Patent
Sacre et al.

(10) Patent No.: US 8,248,695 B2
(45) Date of Patent: Aug. 21, 2012

(54) ILLUMINATING DEVICE WITH POLARIZATION RECYCLING IN A DOUBLE PRISM

(75) Inventors: Jean-Jacques Sacre, Chateaugiron (FR); Pascal Benoit, Liffre (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 10/564,987

(22) PCT Filed: Jul. 22, 2004

(86) PCT No.: PCT/EP2004/008282
§ 371 (c)(1), (2), (4) Date: Jul. 14, 2006

(87) PCT Pub. No.: WO2005/008301
PCT Pub. Date: Jan. 27, 2005

(65) Prior Publication Data
US 2006/0274414 A1 Dec. 7, 2006

(30) Foreign Application Priority Data
Jul. 23, 2003 (FR) ...................................... 03/08961

(51) Int. Cl.
*G02B 5/30* (2006.01)
*G02B 27/28* (2006.01)
(52) U.S. Cl. ................................. 359/485.01; 359/485.06
(58) Field of Classification Search .................. 359/486, 359/485.05, 487.05, 485.01, 485.06
See application file for complete search history.

(56) References Cited

U.S. PATENT DOCUMENTS

| | | | |
|---|---|---|---|
| 3,436,143 A | 4/1969 | Garrett | |
| 5,267,029 A | 11/1993 | Kurematsu et al. | |
| 5,634,704 A * | 6/1997 | Shikama et al. | 353/31 |
| 5,716,122 A | 2/1998 | Esaki et al. | |
| 6,049,404 A * | 4/2000 | Wu et al. | 385/16 |
| 6,604,828 B2 * | 8/2003 | Lu | 353/33 |
| 2003/0210379 A1 * | 11/2003 | Magarill et al. | 353/20 |
| 2004/0070829 A1 * | 4/2004 | Kurtz et al. | 359/486 |
| 2004/0160578 A1 * | 8/2004 | Lu | 353/20 |

FOREIGN PATENT DOCUMENTS

| | | |
|---|---|---|
| JP | 4-267203 | 9/1992 |
| JP | 04267203 A * | 9/1992 |

OTHER PUBLICATIONS

Patent Abstracts of Japan, vol. 017, No. 054, Feb. 3, 1993 & JP 04-267203.
D. Hansen et al., "The Display Applications and Physic of the ProFlux Wire Grid Polarizer", SID 02 Digest. vol. XXXIV, May 20, 2003, pp. 730-733.
Search Report Dated October 15, 2004.

* cited by examiner

*Primary Examiner* — Jade R Chwasz
(74) *Attorney, Agent, or Firm* — Myers Wolin, LLC

(57) ABSTRACT

An illuminating device is described comprising an optical source emitting an unpolarized light beam, a polarizing beam splitter comprising a grid polarizer situated between the faces of two prisms. The light beam penetrates into the first prism through a face and reaches the polarizing beam splitter that transmits the light having a first polarization direction to the face that reflects it toward an exit face. In addition, the splitter reflects the light having a second polarization direction to the face that reflects it toward an exit face.

6 Claims, 2 Drawing Sheets

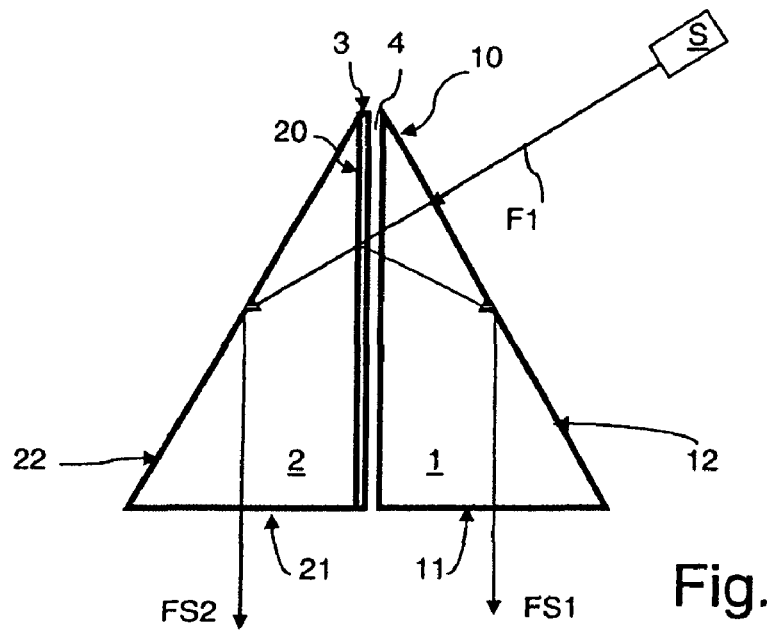
Fig. 1
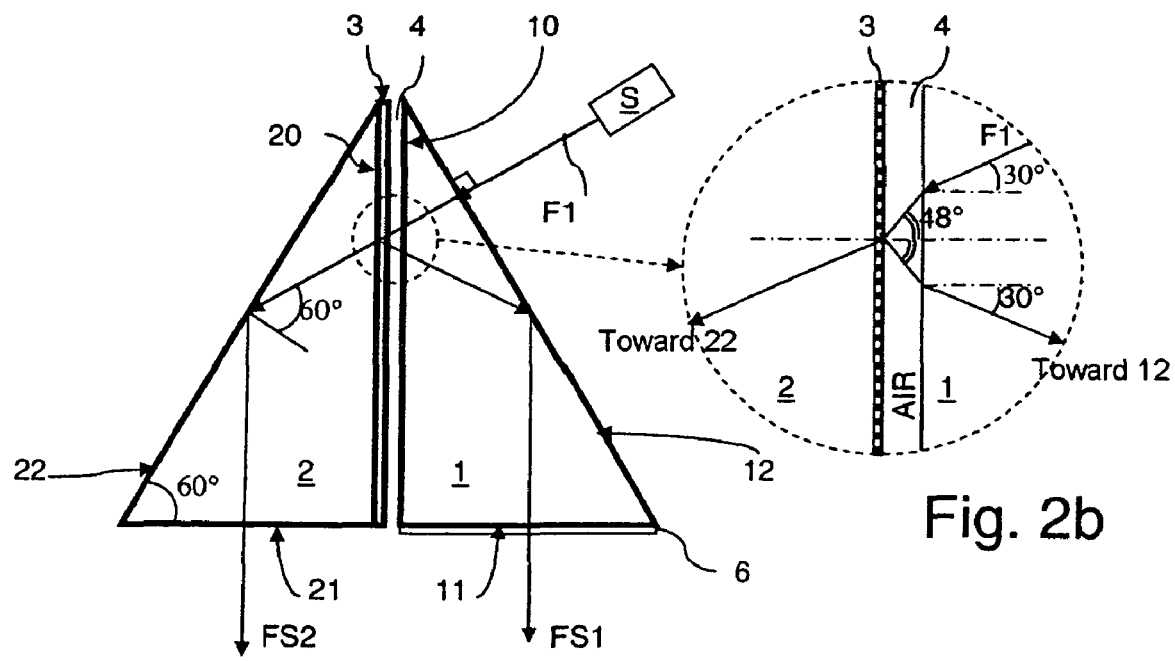
Fig. 2b
Fig. 2a

ILLUMINATING DEVICE WITH POLARIZATION RECYCLING IN A DOUBLE PRISM

BACKGROUND OF THE INVENTION

The invention relates to a system for illuminating an object and notably to a system requiring illumination using polarized light. The invention is notably applicable in liquid-crystal projection and backprojection systems.

Liquid crystal cells that allow light to be modulated for displaying images need to be illuminated by means of polarized light in order to operate. When using a source of unpolarized light, a means for using the two polarizations of the light must be provided in order to avoid losing 50% of the luminous power emitted by the illuminating source, which does not take account of the losses by absorption in the polarizers.

A system described in U.S. Pat. No. 5,784,181 is notably known that provides two prisms whose cross sections are right-angled triangles and which sandwich a holographic polarizing beam splitter between faces each containing one side of the right angle of the right-angled triangles. The other faces of the prisms containing the other side of the right angle of the right-angled triangle are situated on one and the same plane and are used as exit faces. A source of unpolarized light emits a beam that illuminates a face forming the hypotenuse of a prism in a direction parallel to the cross section of the prism. The light reaches the holographic splitter which transmits light with a first polarization to the exit face of a prism which contains a device for transforming this first polarization into a second polarization, whereas it reflects light with a second polarization to the exit face of the other prism which does not contain a polarization conversion device. Holographic devices are associated with the exit faces that allow the directions of the beams, which have the same polarization downstream of the exit faces, to be changed, so as to make the beams parallel in order that they illuminate a liquid crystal cell in one and the same direction.

However, in such a system, the holographic devices must be illuminated or "read" under a Brewster angle of incidence of around 45°. Hence, they have difficulty operating under an incidence of around 30°. This system therefore has the drawback, since it uses holographic devices, of requiring an illuminating beam with a low divergence. Furthermore, this system is only effective within a limited spectral band. Typically, each holographic device is only effective within one primary spectral band (red, green or blue) of visible light.

The document U.S. Pat. No. 5,716,122 describes a polarization recycling system also using two prisms separated by a polarizing beam splitter of the thin-film multilayer type (see columns 4 and 5-column 17, lines 42-49); according to this document, the incident beam is not necessarily only composed of parallel rays, but may include nonparallel components (column 19, lines 15-17); however, the angles of incidence on the polarizing beam splitter that are mentioned in this document are in the range between 45° and 38°, which represents an undesirable limitation when the incident beam has a wide divergence, notably higher than or equal to 5° on either side of the general direction of this beam.

Other documents, such as U.S. Pat. No. 4,575,191, U.S. Pat. No. 4,161,349, U.S. Pat. No. 3,987,299, describe systems known as Koesters systems which also provide two prisms whose cross sections are right-angled triangles and which here sandwich a color splitter between the faces each containing one side of the right angle of the right-angled triangles.

The aim of the invention is therefore to provide a solution to the aforementioned drawbacks.

The invention therefore relates to an illuminating device comprising an optical source emitting an unpolarized light beam. A polarizing beam splitter is included between first faces of a first and of a second transparent prism. These prisms each have a second exit face both situated within one and the same plane. The first faces and the second faces of each prism are perpendicular. The light beam penetrates into the first prism through a third face of this prism and reaches the polarizing beam splitter that transmits the light with a first polarization direction and that reflects the light with a second polarization direction. Furthermore, the polarizing beam splitter comprises a grid polarizer situated between the first faces of the first and of the second prism. In addition, the light transmitted by the polarizing beam splitter is transmitted to a third face of the second prism that reflects it toward said second exit face of the second prism, whereas the light reflected by the polarizing beam splitter is transmitted to said third face of the first prism that reflects it toward said second exit face of the first prism. Thanks to the use of a grid polarizer, the polarization can be effectively separated over a wide range of angles of incidence; this also allows the third face of the first prism to be illuminated by a beam originating from the source with a wide divergence, notably greater than or equal to 5° on either side of the average direction of the beam; preferably, this divergence nevertheless remains less than or equal to 10° on either side of the average direction of the beam.

Advantageously, the system comprises a polarization rotator device associated with one of said second exit faces of the prisms. This device then allows the same polarization direction to be obtained downstream of two exit faces.

Advantageously, said grid polarizer is formed on the first face of the first prism or on the first face of the second prism.

An air gap is advantageously provided between, on the one hand, the grid polarizer and said first face of the first or of the second prism on which it is formed and, on the other, the other first face of the second or of the first prism (2 or 1), respectively, situated facing it. This air gap can be used for cooling the system.

According to one embodiment of the system of the invention, the non-right angles of the prisms are substantially equal to 60° opposite the first faces and to 30° opposite the second faces, and the average direction of the light beam F1 is substantially perpendicular to the third face of the first prism as it penetrates into this prism. Such a geometrical configuration ensures that the average direction of the beam passing through the second exit face of the first prism and the average direction of the beam passing through the second exit face of the second prism are substantially parallel to one another and perpendicular to these second faces. This configuration is therefore designed so that the optical axes of the beams emerging from the exit faces are parallel. It should also be noted that, downstream of the splitter, by way of this geometric configuration, the optical paths of the two separate beams are then approximately identical, a fact which is very advantageous for the application of this device to the illumination of a projection system imager.

Preferably, the index of the material of the prisms is less than or equal to 1.5, which allows angles of incidence less than 60° on the grid polarizer to be obtained, even for a wide divergence of the beam.

Advantageously, the system may comprise a light integrating device having an entry face that is optically coupled to said second exit faces of the prisms and that, receiving the beams reflected by the third faces of the prisms, delivers a beam through an exit face whose illumination is substantially homogeneous over this face. For this purpose, a rod integrator is advantageously used.

Advantageously, the light beam emitted by the source is an uncollimated beam such that the envelopes of the beams received by the light integrator device are such that all of the beams penetrate into the integrator device.

BRIEF DESCRIPTION OF THE DRAWING

The various aspects and features of the invention will become more clearly apparent in the description that follows and in the appended drawings which show:

FIG. 1, a general example of an illuminating system according to one embodiment of the invention, FIGS. 2a and 2b, a more detailed example of an illuminating system according to one embodiment of the invention, FIG. 3, an example of application of the invention to a projection system according to the invention.

DETAILED DESCRIPTION

Figure 3:
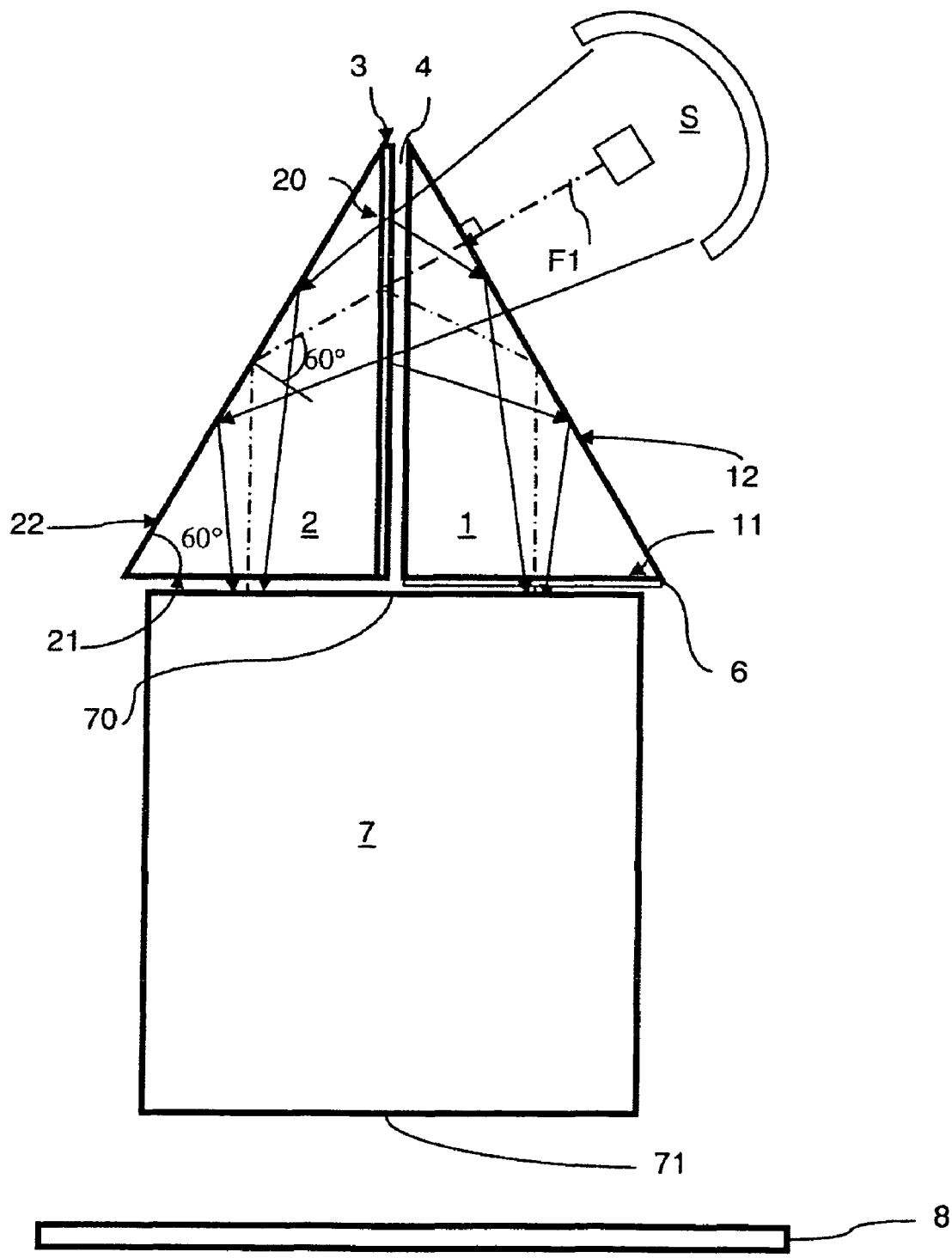

An example of an illuminating system according to the invention will therefore be described with reference to FIG. 1.

This system comprises a light source S emitting an unpolarized light beam F1 toward two prisms 1 and 2. These two prisms have cross sections in the plane of incidence of the beam F1 and take the form of right-angled triangles. Two sides 10 and 20 of the right-angled corners of the prisms sandwich a polarizing beam splitter device 3. The two other faces 11 and 21 of the right-angled corners of the prisms are situated in one and the same plane. These faces 11 and 21 will serve as exit faces of the prisms.

The face 12 of the prism 1 containing the hypotenuse of the cross section of the prism 1 will serve as the entry face of the system.

The beam F1 has an angle of incidence on the face 12 that allows it to enter the prism 1. Advantageously, the beam F1 is substantially perpendicular to the face 12.

According to the invention, the polarizing beam splitter is a grid polarizing beam splitter; in order to notably allow its cooling, an air gap 4 is provided here in between the splitter and the prism 1. For an appropriate angle of incidence of an incident ray, the light polarized in one direction will not (or hardly) be influenced by the polarizing beam splitter, whereas the light polarized in a perpendicular direction will be reflected by the polarizing beam splitter.

The beam F1 therefore reaches the polarizing beam splitter 3 that transmits the light polarized in one direction toward the face 22 of the prism 2, which contains the hypotenuse of the cross section of this prism, and that reflects, toward the face 12 of the prism 1, the light polarized in a direction perpendicular to the first direction. More precisely, it transmits the light whose direction of polarization is perpendicular to the direction of the elements of the polarization grid 3, and it reflects the light whose polarization direction is parallel to these elements.

A description of a grid polarizing beam splitter will be found in the document U.S. Pat. No. 6,122,103. Preferably, the orientation of the polarizer is such that the grid elements are perpendicular to the plane of FIG. 1. In this case, the polarization S will be reflected. This reflection will occur toward the face 10 and the light received on the face 10 must normally be transmitted toward the face 12 of the prism 1. This is the reason why, in the exemplary embodiment in FIG. 1, in order to avoid that the light or a part of the light be reflected between the polarizer 3 and the face 10 of the prism 1, this face 10 will advantageously receive an anti-reflective coating.

In the exemplary embodiment in FIG. 1, the polarizing beam splitter is applied to the face 20 of the prism 2. However, it is clear that if it is applied to the face 10 of the prism 1, then it is the face 20 of the prism 2 that would advantageously receive an antireflective coating.

The face 22 of the prism 2 reflects the light transmitted toward the face 21. This reflection occurs either by total internal reflection, or by total reflection on the face 22 with a reflective coating (for example metallic).

The face 12 reflects by total internal reflection the light reflected by the polarizing beam splitter toward the face 11.

Advantageously, the angles of the prisms and the angle of incidence of the beam F1 on the face 12 are chosen so that the directions of the two exit beams FS1 and FS2 are parallel.

FIG. 2a shows a more detailed exemplary embodiment of the system in FIG. 1.

In order that the direction of the beams FS1 and FS2 are parallel, the prisms 1 and 2 have their faces 11 and 12, on the one hand, and 21 and 22, on the other, forming angles of 60°. In addition, the direction of the beam F1 is preferably substantially normal to the plane of the entry face 12. The direction of the beam F1 therefore preferably forms an angle of incidence of 30° with respect to the plane of the face 10 (see FIG. 2b).

Thus, as previously indicated, if an air gap is provided in between the polarizer and the face 10 of the prism 1, and if the prisms are made of glass, for example of BK7 with index of around 1.5, the angle of incidence of the direction of the beam F1 on the polarizing beam splitter 3 is then around 48°. This therefore implies, as is shown in FIG. 2b, that a light ray of the beam F1 forming an angle of incidence of 30° with the face 10, will form an angle of incidence of around 48° on the plane of the polarizing beam splitter 3.

The advantage in using a grid polarizing beam splitter is that it has a very high separation efficiency over a wide range of angles of incidence, which here allows it to be illuminated by an uncollimated beam F1, notably exhibiting a large divergence that is greater than or equal to 5° on either side of its average direction. An optimum efficiency for this splitter is obtained for angles of incidence of the rays of the beam F1 in the range between 0° and 60°. With an angle of incidence of 48°, it is therefore within the optimal range of operation.

In addition, if the light beam emitted by the source is uncollimated, the use of a grid polarizing beam splitter will also split the light of a beam whose angular divergence is distributed either side of an average direction having this angle of incidence of around 48° with the plane of the grid polarizing beam splitter, while at the same time exhibiting a high separation efficiency. In practice, the beam divergence could be acceptable up to 9 or 10° on either side of the average direction of the beam. The configuration will therefore be that in which the grid splitter operates with angles of incidence of the incident light of, for example, between 48°+10° and 48°−10°. This configuration will therefore allow the polarizing beam splitter to be operated with an optimal efficiency.

In order to obtain an illuminating system delivering an illuminating beam polarized in only one direction, a polarization rotator 6 is provided that is associated with only one of the exit faces of the prisms, the face 11 for example. This polarization rotator therefore makes the direction of polarization of the beam reflected by the face 12 of the prism 1 rotate by 90°.

FIG. 3 shows a system in which a light integrator device 7 is provided. This device is coupled to the exit faces 11 and 21 of the prisms 1 and 2 so as to allow the coupling of all of the light reflected by the faces 12 and 22.

Preferably, as is shown in FIG. 3, the light beam emitted by the source S is focused close to the entry face 70 of the integrator device 7. The integrator device delivers via its exit face 71 a relatively homogeneous beam that allows an object 8 to be illuminated in a uniform manner. In the case of a projection apparatus, this object is a spatial light modulator which modulates the received light and allows an image displayed on the spatial light modulator to be projected onto a screen.

The grid polarizing beam splitter is formed on the face 20 of the prism 2 in the form of an array of bands of material that is reflective for the light emitted by the source S. This material can be a metal such as aluminum. The pitch of the bands is, for example, of the order of a few tens of nanometers and the width of each band is a few nanometers.

Such an illuminating system has the advantages of operating with an uncollimated beam emitted by the source and of delivering a homogeneous illumination at the exit of the integrator device. In addition, such a system operates over a wide range of wavelengths and especially in the visible range.

The invention claimed is:

1. An illuminating device comprising an optical source emitting an unpolarized light beam, a polarizing beam splitter comprising a grid polarizer included between first faces of a first and of a second transparent prism, which prisms each have a second exit face both situated within one and the same plane, said first faces and second faces of each prism being perpendicular; the unpolarized light beam penetrating into the first prism through a third face of this first prism and reaching the polarizing beam splitter that transmits the light with a first polarization direction and that reflects the light with a second polarization direction; the light transmitted by the polarizing beam splitter being transmitted to a third face of the second prism that reflects it toward said second exit face of the second prism, and the light reflected by the polarizing beam splitter being transmitted to said third face of the first prism that reflects it toward said second exit face of the first prism, wherein the grid polarizer is formed on the first face of one transparent prism selected from the group including the first prism and the second prism, and wherein an antireflective coating is provided on the first face of the other transparent prism, which other transparent prism lacks the grid polarizer thereon, wherein an air gap is provided for cooling between the grid polarizer and the antireflective coating, and wherein the divergence of said light beam is greater than or equal to 5° on either side of the average direction of said beam.

2. The illuminating device as claimed in claim 1, wherein the non-right angles of the prisms are substantially equal to 60° opposite the first faces and to 30° opposite the second face, and wherein the average direction of said light beam is substantially perpendicular to the third face of the first prism as it penetrates into this prism.

3. The illuminating device as claimed in claim 1, wherein the divergence of said light beam is less than or equal to 10° on either side of the average direction of said beam.

4. The illuminating device as claimed in claim 1, wherein the index of the material of the prisms is less than or equal to 1.5.

5. The illuminating device as claimed in claim 1 comprising also a polarization rotator device associated with only one of said second exit faces of the prisms.

6. The illuminating device as claimed in claim 5 comprising also a light integrating device, and a spatial light modulator of a liquid crystal type, wherein said light integrating device has one entry face that is optically coupled to said second exit faces of the prisms and has one exit face, different from the entry face, that is optically coupled with the liquid crystal layer of said spatial light modulator, wherein said light integrating device, when receiving the beams reflected by the third faces of the prisms through said entry face, delivers a beam through said exit face such that illumination of said exit face is substantially homogeneous over this exit face such as to illuminate through said exit face the liquid crystal layer of said spatial light modulator in a uniform manner.

* * * * *